United States Patent
Rubin et al.

(10) Patent No.: US 9,607,133 B1
(45) Date of Patent: Mar. 28, 2017

(54) METHOD AND APPARATUS FOR WATERMARKING BINARY COMPUTER CODE

(75) Inventors: Robert Rubin, Oakland, CA (US); Eric Murray, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2130 days.

(21) Appl. No.: 11/938,080

(22) Filed: Nov. 9, 2007

Related U.S. Application Data

(62) Division of application No. 10/223,256, filed on Aug. 16, 2002, now abandoned.

(51) Int. Cl.
G06F 21/16 (2013.01)
G06F 11/36 (2006.01)

(52) U.S. Cl.
CPC .......... G06F 21/16 (2013.01); *G06F 11/3604* (2013.01)

(58) Field of Classification Search
None
See application file for complete search history.

(56) References Cited

U.S. PATENT DOCUMENTS

| | | | |
|---|---|---|---|
| 6,934,942 B1 * | 8/2005 | Chilimbi | 717/158 |
| 7,650,008 B2 * | 1/2010 | Rhoads | 382/100 |
| 7,770,016 B2 * | 8/2010 | Horne et al. | 713/176 |
| 2007/0271191 A1 * | 11/2007 | Torrubia-Saez | 705/59 |
| 2008/0120724 A1 * | 5/2008 | Brown | 726/26 |
| 2010/0268958 A1 * | 10/2010 | Horne et al. | 713/176 |

OTHER PUBLICATIONS

Monden et al. "A Practical Method for Watermaking Java Programs", compsac2000, Oct. 2000, pp. 1-6.*
Pollock et al. "Incremental Compilation of Locally Optimized Code", Department of Computer Science, University of Pittsburgh, 1984, pp. 152-163.*
Incremental Compilation of Locally Optimized Code, (Lori L. Pollock et al. 1984, Department of Computer Science, University of Pittsburgh, ACM 0-89791-147/85/001/0152).*
A practical method for Watermarking Java Programs, (Akito Monden et al. The 24th Computer Software and Applications Conference (compsac2000), Taipei, Taiwan, Oct. 2000).*

* cited by examiner

*Primary Examiner* — Isaac T Tecklu
(74) *Attorney, Agent, or Firm* — Artegis Law Group, LLP

(57) ABSTRACT

A method and apparatus for inserting a watermark into a compiled computer program. A location process specifies an insertion point in the compiled program and a watermark generating process inserts a watermark, based on data to be encoded, into the program at the insertion point. The location process is also utilized to specify the location of watermark data to be decoded.

15 Claims, 5 Drawing Sheets

Watermarking code using option 2
An unneeded " movl %edx, %ebp" is added but does nothing since edx is not used in this function. It's presence (a change from the original code) encodes the first '1' bit of the data.

Fig. 1 Watermarking code using option 1 "data" is added at the location returned from R()

METHOD AND APPARATUS FOR WATERMARKING BINARY COMPUTER CODE

CROSS-REFERENCE TO RELATED APPLICATIONS

This application is a divisional of co-pending U.S. patent application Ser. No. 10/223,256, filed Aug. 16, 2002. The aforementioned related patent application is herein incorporated by reference.

BACKGROUND OF THE INVENTION

It can be useful to be able to identify the code produced by different compilers to, among other uses, identify non-licensed uses of the compilers and to track errors. Accordingly, compiler manufacturers require a method of including a serial number or other information in code produced by a compiler. Additionally, a method of analyzing a copy of the compiled code to determine the serial number or other information is also required.

A private watermark, which is data hidden via steganography, is one method for embedding data in the outputs of licensed programs. However, traditional steganography requires the presence of "low order" bits in the data stream. The low order bits can be changed without the data changing so much that a human can notice the difference. The changed bits, detected when the modified data is compared to the original, can hold the steganographic data. Since traditional stenography changes non-significant low-order bits, steganography is normally applied to digital pictures and sounds which contain non-significant low-order bits.

Steganography in computer code can't be done with the normal methods because computer code does not contain low-order bits. Every bit in the code is important, and changing even one bit can prevent the code from operating correctly.

Accordingly, improved techniques for inserting identifying watermarks in compiled programs are needed.

BRIEF SUMMARY OF THE INVENTION

In one embodiment of the invention, a method for generating and auditing a watermark for a compiled computer program is provided. The watermark is an integral part of the program and does not appear as an external data item.

In another embodiment, a fixed location in the compiled code is specified and a legal fake instruction that does not affect the operation of the code is inserted. For each binary digit of the data to be embedded, one value of the digit is encoded as a first type of fake instruction and the other value of the binary digit is encoded as a second type of fake instruction.

In another embodiment of the invention, the data itself is inserted into the compiled code at a location or locations determined by a mathematical function. A computer executing the compiled code also knows the function and determines the location(s) and removes the data prior to executing the compiled code. If a computer that does not know the function executes the program then it will crash because the inserted data are not legal instructions.

In another embodiment of the invention, the data is encrypted prior to being inserted in the code.

Other features and advantages of the invention will be apparent in view of the following detailed description and appended drawings.

DETAILED DESCRIPTION OF THE INVENTION

Figure 1:
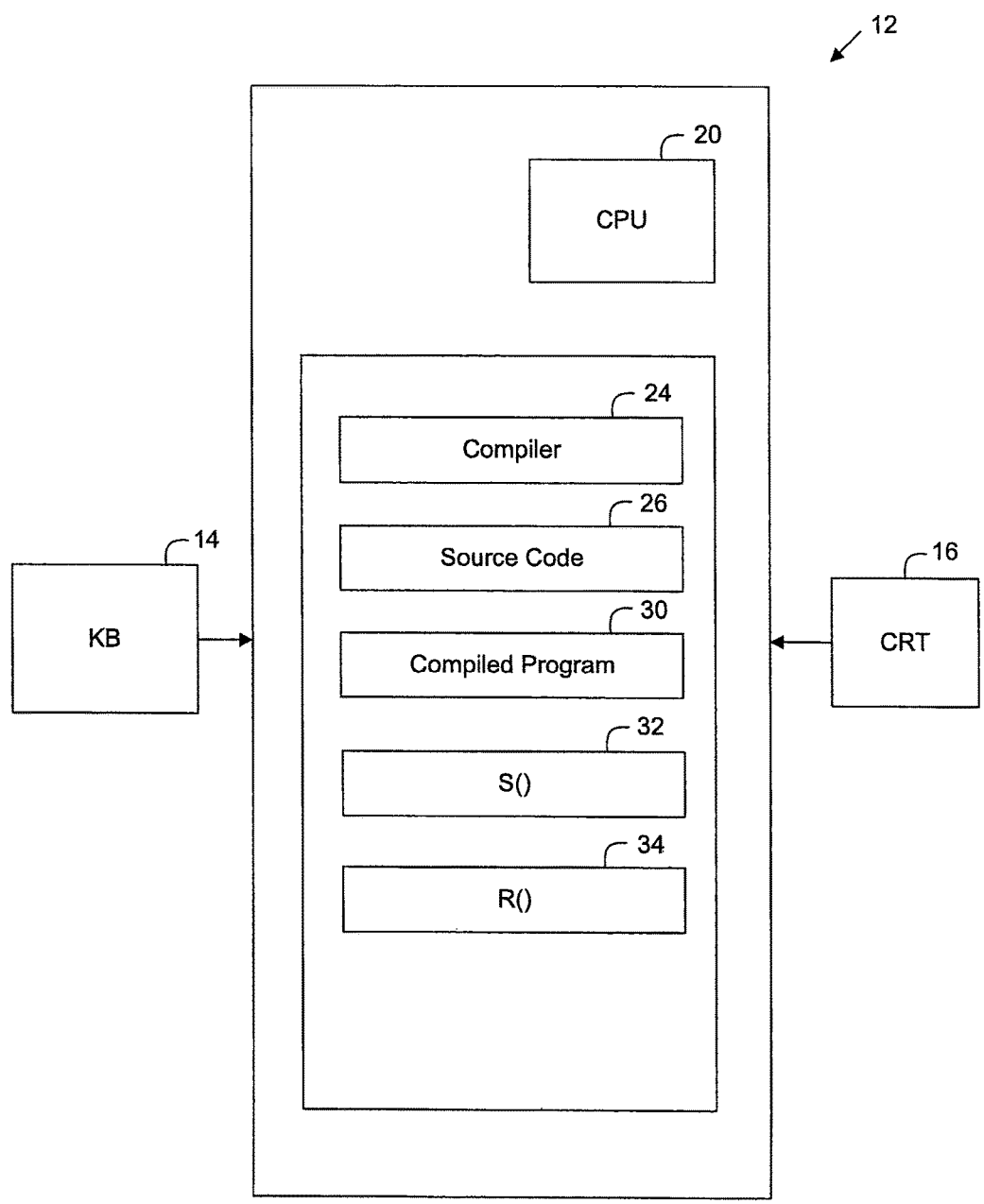
FIG. 1 is a block diagram of a computer system configured to implement an embodiment of the invention.

The invention will now be described, by way of example not limitation, with reference to various embodiments. FIG. 1 is a block diagram of a computer system 10 configured to implement an embodiment of the invention. The computer system 10 includes a computer 12, an input device 14 such as a keyboard, and an output device 16 such as a display screen. The computer 12 includes a main memory 18, which may include RAM and NVRAM, and a central processing unit ("CPU") 20. A compiler 24, a source code module 26, a compiled program 30, a watermark generating process S( ) 32, and a location generating process R( ) 34 are stored in the memory 18. As will be described below, a key, for use by the location generating process, may be stored in the main memory 18.

A first embodiment of the invention will now be described. The compiler and computer processor agree on a function R( ), which is a location determining function 34 that determines one or more insertion points within a given compiled binary code. R( ) may be a constant function or may depend on the binary. In one embodiment, R( ) is a random number generator seeded by some part of the compiled code. Alternatively, R( ) may be a polynomial with inputs communicated by the compiled binary code.

In an alternative embodiment, a value to be provided to R( ) can be processor specific and stored in the main memory 18 of the computer.

Figure 2:
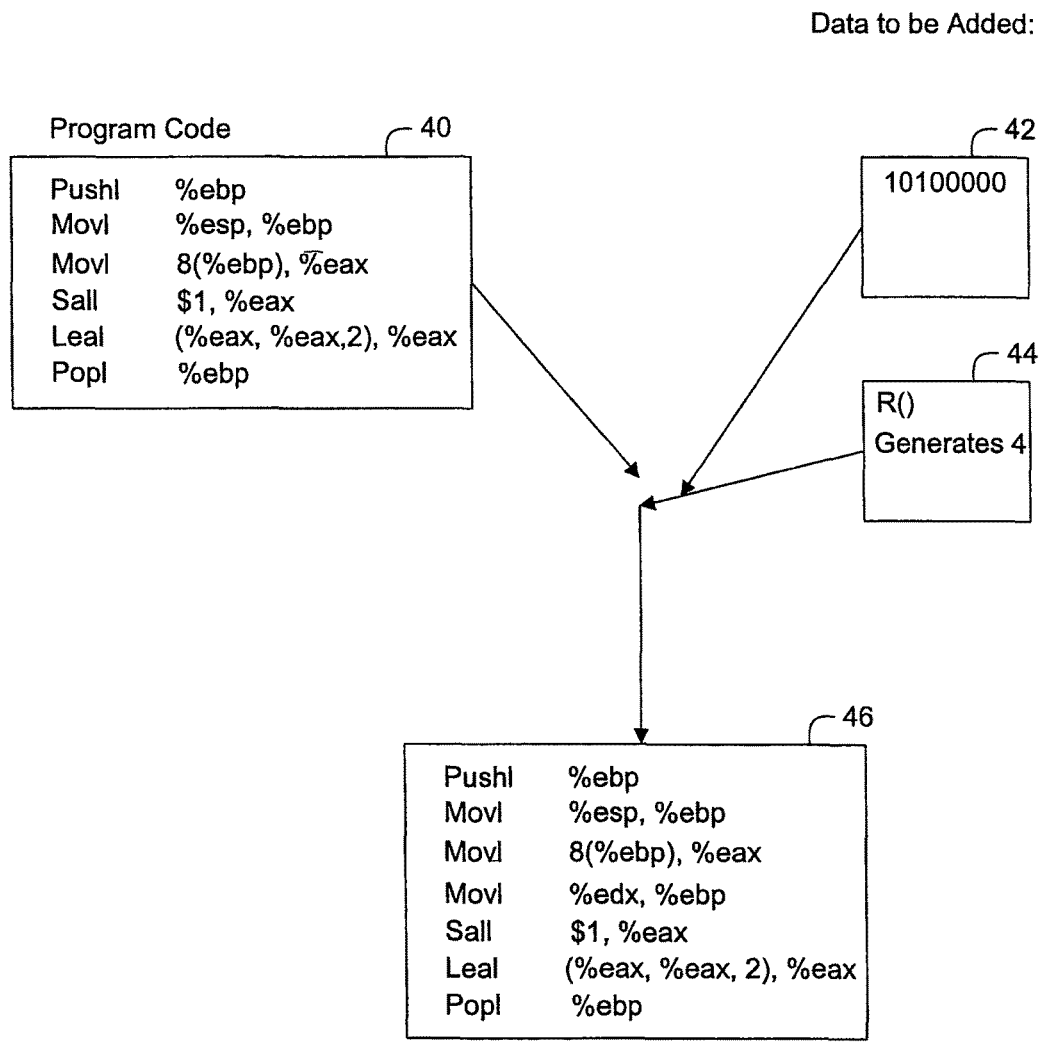
FIG. 2 is a block diagram depicting the operation of an embodiment that encodes the watermark by inserting a fake instruction.

The operation of the first embodiment will now be described in more detail with reference to FIGS. 2-4. Referring to FIG. 2, a first block 40 depicts the unmodified program instructions, a second block 42 depicts the data to be added, in this example "1010000", a third block 44 depicts the insertion point generated, in this example "4", and a fourth block 46 depicts the resulting modified instructions. In this example it is assumed that the lines of program instructions are numbered sequentially.

Figure 3:
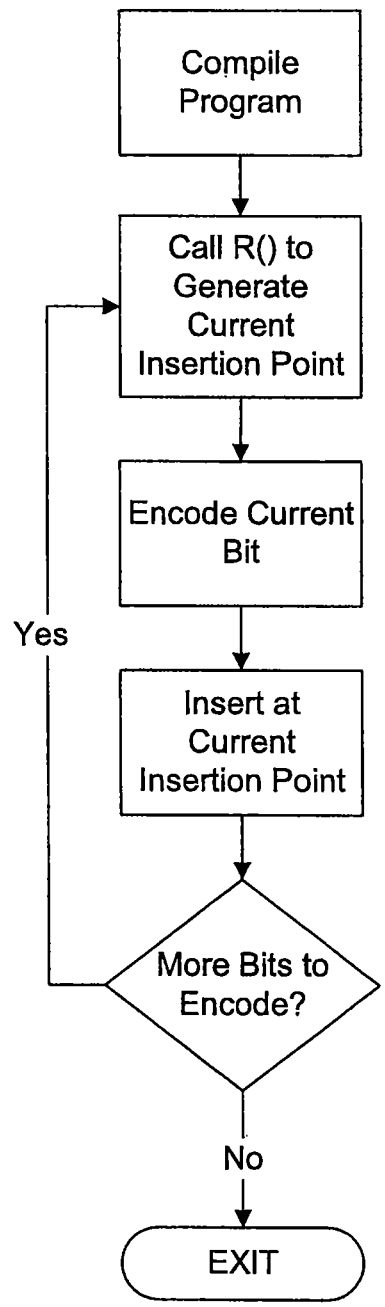
FIG. 3 is a flowchart of the watermark encoding process of an embodiment of the invention.
Figure 4:
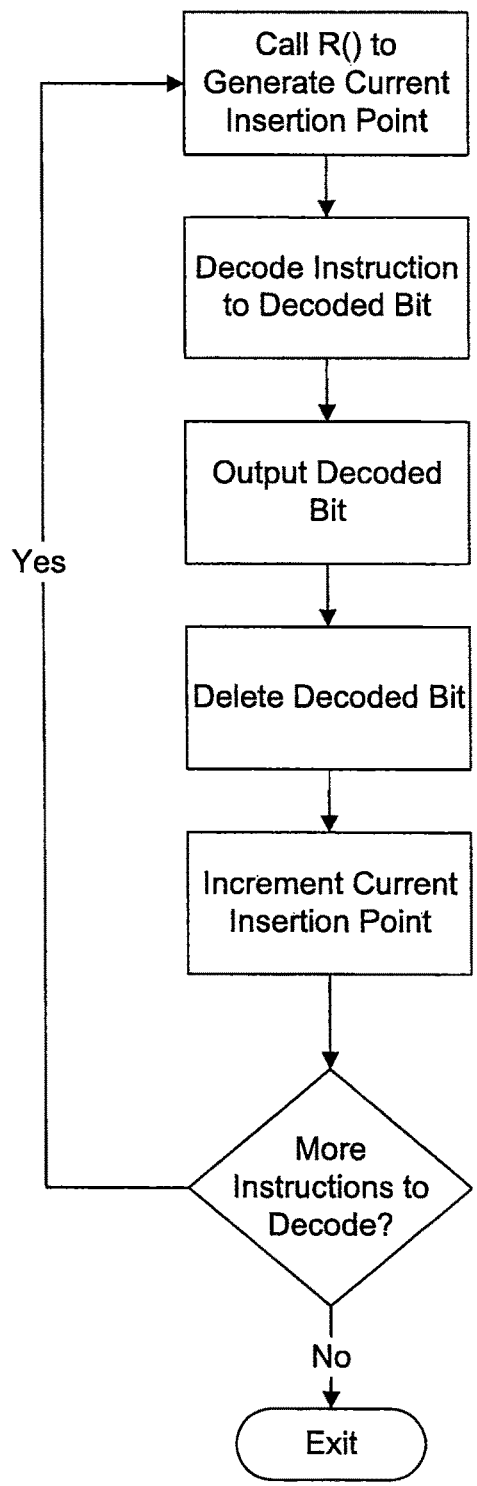
FIG. 4 is a flowchart of the watermark decoding process of an embodiment of the invention.

Referring now to the flowchart of FIG. 3, R( ) is called and generates a first insertion point as described above. The first bit of the data to be encoded, "1", is then encoded as a fake move instruction. The compiler resources are utilized to identify unused registers which can be used as the arguments of the fake move instruction. Thus, in this case, the "movl % edx,% ebp" instruction does nothing because edx is not used in this function. The presence of the "movl" instruction in the compiled program (a change from the original program) encodes the first "1" bit of the data to be embedded.

The process then loops to call R( ) again to generate a second insertion point offset from the first insertion point. The second bit, "0", of the data is encoded. The encoding of the bits can be implemented in various ways.

In the currently described embodiment a first fake instruction, e.g., mov1 is utilized to encode "1" and a second fake instruction is utilized to encode "0'.

The bit "0" could be encoded as "0", i.e., no instruction, or as another fake instruction that does nothing such as an "add" instruction that adds operands in unused registers. The fake instruction is then inserted at the incremented insertion point. The process continues to loop until all the data bits are encoded into the compiled program.

The auditing and/or removal of the encoded data will now be described with reference to flowchart of FIG. 4. R( ) is called to locate the insertion point. The fake instruction at the insertion point is decoded by S( ) to generate the first bit, "1", of the digital encoded data. The deletion of the fake instruction is optional because the fake instruction does not affect the operation of the program. The program then loops to decode, and optionally delete, all the fake instructions encoding the watermark.

Figure 5:
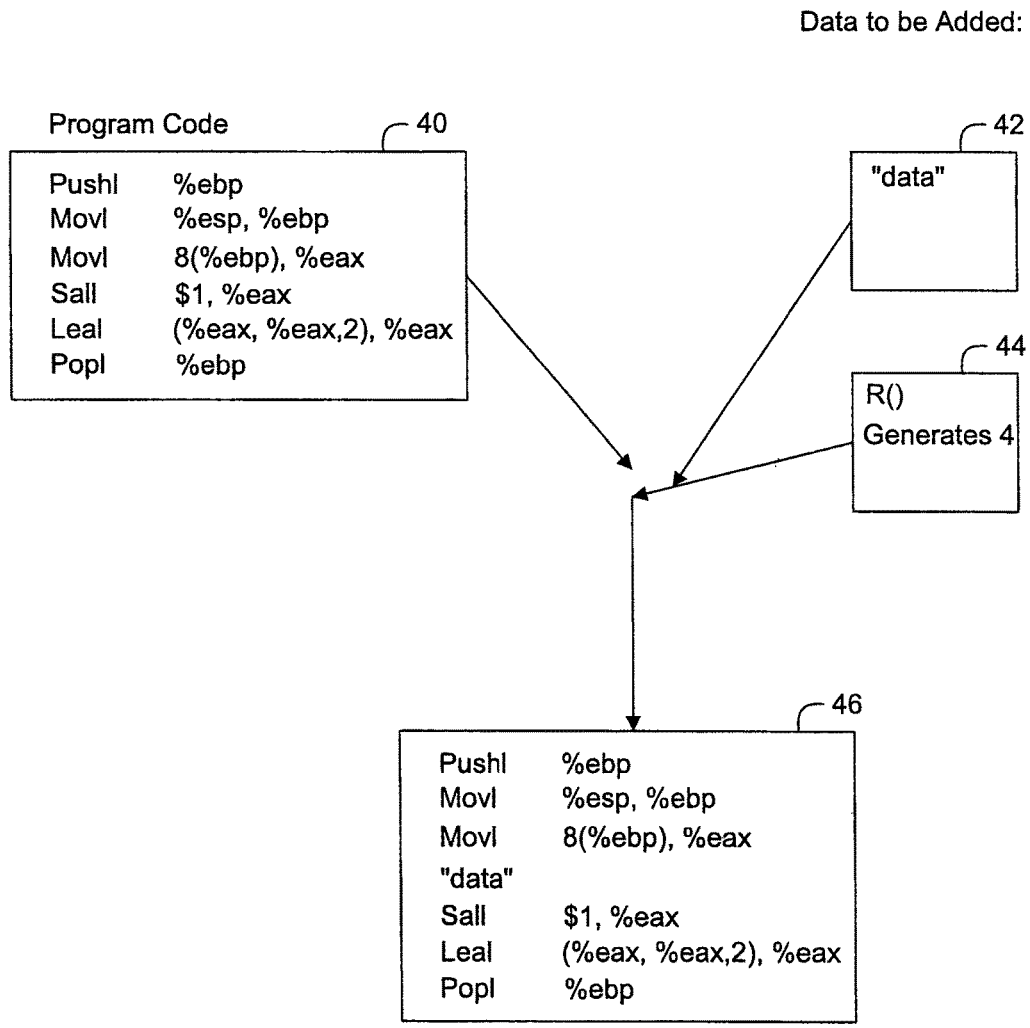
FIG. 5 is a block diagram depicting the operation of an embodiment that encodes the watermark by inserting data to be embedded.

A more detailed description of the second embodiment will now be described with reference to FIG. 5 where the unencoded watermark data is copied into the program code at the insertion point. The steps are the same as described above with reference to FIG. 3 except that the data is not encoded as fake instructions that have no effect The removal of the watermark is the same as the steps described above with reference to FIG. 4 except that the data is not decoded and the removal is mandatory. The data is not a legal instruction and thus would cause the program to crash. An added benefit of this embodiment is that unauthorized users would not be able to use the compiled program.

For either embodiment described above, the data inserted as watermarks can be public or private. Private data can be encrypted or made private in some other way.

A lot of data can be stored in the watermark this way. In the first embodiment, it is difficult to find (and thus strip out) the watermark data. In the second embodiment, the program will not execute on a processor which does not know the function R( ), even if it supports the same instruction set.

The invention has now been described with reference to the preferred embodiments. Alternatives and substitutions will now be apparent to persons of ordinary skill in the art. For example, the types of fake instruction which can encode the digital data to be encoded are not limited to the examples described. Additionally, groups of bits or characters could be encoded and inserted at a single insertion point. Accordingly, it is not intended to limit the invention except as provided by the appended claims.

What is claimed is:

1. In a computer system, a method for encoding data as a watermark in executable code of a computer program generated by a compiler, with the data including a sequence of fake executable instructions, the method comprising:
   identifying in the compiler a location determining function R(o) for determining insertion points within the executable code;
   executing the function R(o) to generate a plurality of instruction numbers specifying a plurality of insertion points in the computer program, wherein each instruction number corresponds to a sequentially numbered instruction included in the computer program;
   executing an encoding function that, for each instance of a first character included in the data to be embedded, inserts a first type of fake executable instruction into the computer program at an insertion point included in the plurality of insertion points, and, for each instance of a second character included in the data to be embedded, inserts a second type of fake executable instruction into the computer program at an insertion point included in the plurality of insertion points;
   identifying unused registers for use as arguments of the fake executable instructions; and
   repeating the execution of the function R(o) until the sequence of fake executable instructions comprising the watermark is inserted.

2. A method as claimed in claim 1 wherein R(o) is a constant function.

3. A method as claimed in claim 1 wherein R(o) is a random number generator, the method including the step of seeding the random number generator by the executable code.

4. In a computer system, a method for encoding data as a watermark, the data including a sequence of fake executable instructions, in an executable copy of a computer program generated by a compiler, the method comprising:
   executing an instruction number generating process to generate a sequence of instruction numbers specifying insertion points in the computer program;
   identifying unused registers for use as arguments of the fake executable instruction; and
   executing an encoding function that, for each instance of a first character included in the data to be embedded, inserts a first type of fake executable instruction into the computer program at an insertion point included in the plurality of insertion points, and, for each instance of a second character included in the data to be embedded, inserts a second type of fake executable instruction into the computer program at an insertion point included in the plurality of insertion points.

5. The method of claim 4 further comprising the acts of:
   executing a decoding function for decoding the fake executable instructions, inserted at the insertion points, into binary digits; and
   outputting the binary digits as part of the decoded data.

6. In a computer system, a method for encoding data as a watermark in an executable copy of a computer program generated by a compiler and for decoding the watermark to recover the data, with the data including a plurality of fake executable instructions, the method comprising:
   for each character included in the data to be encoded:
      calling a location determining process to generate an insertion point in the executable copy of the computer program, wherein an instruction number corresponding to a sequentially numbered instruction included in the computer program specifies the insertion point;
      inserting a representation of a character comprising a fake executable instruction at the insertion point, wherein a first type of fake executable instruction is inserted at the insertion point when the character is a first type of character, and a second type of fake executable instruction is inserted at the insertion point when the character is a second type of character; and
      identifying unused registers for use as arguments of the fake executable instruction;
   for each representation to be decoded:
      calling the location determining process to generate the location in the executable copy of the computer program of the representation to be decoded; and
      decoding the representation to recover the characters that were encoded.

7. A non-transitory computer-readable storage medium storing instructions that, when executed by a processor, cause the processor to encode data as a watermark in executable code of a computer program generated by a compiler, with the data including a sequence of fake executable instructions by performing the steps of:

executing the function R(o) to generate a plurality of instruction numbers specifying a plurality of insertion points in the computer program, wherein each instruction number corresponds to a sequentially numbered instruction included in the computer program;

executing an encoding function that, for each instance of a first character included in the data to be embedded, inserts a first type of fake executable instruction into the computer program at an insertion point included in the plurality of insertion points, and, for each instance of a second character included in the data to be embedded, inserts a second type of fake executable instruction into the computer program at an insertion point included in the plurality of insertion points;

identifying unused registers for use as arguments of the fake executable instructions; and repeating the execution of the function R(o) until the sequence of fake executable instructions comprising the watermark is inserted.

8. The non-transitory computer-readable storage medium of claim 7 further comprising decoding the fake executable instructions to recover the watermark.

9. A non-transitory computer-readable storage medium of claim 7 wherein the function R(o) is based on a value provided to the compiler and stored in a memory of the computer executing the computer program.

10. A non-transitory computer-readable storage medium of claim 7 wherein the function R(o) is based on the program code.

11. A method as claimed in claim 1, wherein R(o) is a polynomial with inputs communicated by the executable code.

12. The method of claim 6, wherein the location determining process is a polynomial with inputs communicated by the executable copy of the computer program.

13. The method of claim 6, wherein the fake executable instructions do not affect operation of the executable copy of the computer program and the fake executable instructions are not deleted from the executable copy of the computer program.

14. The non-transitory computer-readable storage medium of claim 7, wherein the first type of fake executable instruction encodes a "1" and is configured to perform a first operation, and the second type of fake executable instruction encodes a "0" and is configured to perform a second operation that is different than the first operation.

15. The non-transitory computer-readable storage medium of claim 7, wherein the executable fake instructions do not affect operation of the computer program and the fake-executable instructions are not deleted from the computer program.

* * * * *